United States Patent [19]

Kuo et al.

[11] Patent Number: 5,299,309

[45] Date of Patent: Mar. 29, 1994

[54] FAST GRAPHICS CONTROL SYSTEM CAPABLE OF SIMULTANEOUSLY STORING AND EXECUTING GRAPHICS COMMANDS

[75] Inventors: Bor-Chuan Kuo, Hsinchu City; Cheun-Song Lin, Taichung City; Lie-Der Lin, Taipei; Shu-Wei Wang, Chungli, all of Taiwan

[73] Assignee: Industrial Technology Research Institute, Chutung Hsinchu, Taiwan

[21] Appl. No.: 816,702

[22] Filed: Jan. 2, 1992

[51] Int. Cl.$^5$ .............................. G06F 15/20
[52] U.S. Cl. ...................... 395/162; 395/164; 395/163
[58] Field of Search ................ 395/162–166, 395/157, 400, 425, 375; 340/799, 798, 723

[56] References Cited

U.S. PATENT DOCUMENTS

| | | | |
|---|---|---|---|
| 4,791,580 | 12/1988 | Sherriel et al. | 340/703 |
| 4,811,205 | 3/1989 | Normington et al. | 395/163 |
| 4,870,406 | 7/1989 | Gupta et al. | 340/701 |
| 4,916,301 | 4/1990 | Mansfield et al. | 395/163 |
| 5,046,023 | 9/1991 | Katsura et al. | 395/162 |

Primary Examiner—Dale M. Shaw
Assistant Examiner—Kee M. Tung
Attorney, Agent, or Firm—Meltzer, Lippe, Goldstein, et al.

[57] ABSTRACT

A host computer, a graphics processor which receives and executes commands generated by the host computer, a display memory for storing display data, and a display device for displaying the display data are provided. A graphics context is also provided in which the parameters of a current image are stored. A processing unit for receiving and executing the graphics commands issued by the host computer and for converting the parameters stored in the graphics context into the display data, and a drawing unit for storing the display data in the display memory are also provided. Furthermore, a shared memory is provided which is directly accessible to the host computer so that it can write the parameters of a next graphics command into the shared memory while the graphics processor is executing a current command. The shared memory is also directly accessible to the graphics processor so that it can receive the parameters of the next graphics command to be executed directly from the shared memory. In a preferred embodiment, transfers of the graphics parameters between the graphics context and the shared memory are accomplished by employing a bit-block transfer method and a mask register stored in the graphics context.

11 Claims, 6 Drawing Sheets

FAST GRAPHICS CONTROL SYSTEM CAPABLE OF SIMULTANEOUSLY STORING AND EXECUTING GRAPHICS COMMANDS

FIELD OF THE INVENTION

The present invention relates to a graphics control system for a computer system. More particularly, the present invention relates to a graphics control system for a computer system which improves the processing efficiency of the computer, especially when the computer is displaying windows.

BACKGROUND OF THE INVENTION

The ability to display windows is increasingly becoming a common feature of many computers, including personal computers. One common architecture for a graphics control system used to display windows is illustrated in FIG. 1.

As shown in FIG. 1, this conventional graphics control system comprises a host computer 10, a graphics processor 20, a display memory 30, and a display device, such as CRT 32. The host computer 10 comprises a main memory 12 and a CPU 14. All commands relating to the windows display are generated by the host computer 10 which communicates with the graphics processor 20 via the bus 16. The graphics processor 20 is comprised of a processing unit 22, a graphics context 24, and a drawing unit 26. The processing unit 22 performs two functions: 1) it receives and executes the commands issued by the host computer 10; and 2) it converts certain graphics parameters stored in the graphics context 24 into display data. The drawing unit 26 communicates with the display memory 30 via a bus 28. The function of the drawing unit 26 is to write the display data into the display memory 30. The display data is then converted from digital to analog form by a D/A converter (not shown) and then transmitted to the CRT screen 32 and displayed as an image.

The graphics context 24 is a buffer that stores a set of image parameters needed to carry out a current command. For example, to draw a line segment on the CRT 32, the graphics context 24 stores the initial and final addresses of the line segment on the CRT, information relating to foreground color and background color, information relating to the mix of the three primary colors red, green, and blue, and other similar parameters. When displaying windows, other parameters will also need to be stored, such as the manner in which overlapping images will be processed (i.e., whether by AND or NOR processing), the initial and final addresses of the windows on the CRT, etc.

Whenever the image being displayed is to be changed, a great deal of processing must be done. This is especially true when windows images are being displayed. In processing the content of a windows image, the CPU 14 will compute the relevant graphics context parameters, enter them one by one into the graphics context 24, and instruct the graphics processor 20 to execute the drawing command. After execution of the current command has been completed, the host computer 10 will enter new parameters into the graphics context 24 for the next command to be executed.

When it is necessary to swap and move window images, the host computer 10 will have to retain in the main memory 12 the graphics context parameters of the windows image currently being displayed. The host computer 10 will also have to move out the graphics context parameters for the new window image to be displayed from the main memory 12 into the graphics processor 20 and instruct it to execute the next drawing command.

This method of operation is cumbersome and has several disadvantages. First, when the graphics processor is implementing a drawing command, the host computer cannot change any of the parameters stored in the graphics context. Instead, the host has to wait until execution of the current command is completed before it can compute and rewrite the values in the graphics context. As a result, the efficiency of the drawing operation is diminished.

Second, the host computer must refill the graphics context each time window swapping or window movement occurs. As a result, the display speed of the changed window will be decreased, and the efficiency of the host computer, in terms of its general execution speed, will decline.

It is therefore an object of the present invention to provide a graphics control system for a digital computer which does not suffer from these disadvantages. In particular, it is an object of the present invention to provide a graphics control system for a digital computer which is capable of much swifter image processing, including windows image processing, than conventional graphics control systems.

SUMMARY OF THE INVENTION

In accordance with the present invention, an improved graphics control system suitable for windows processing is disclosed. The inventive graphics control system comprises a host computer for generating graphics commands, a graphics processor for receiving and executing commands generated by the host computer, a display memory for storing display data, and a display device for displaying the display data. The graphics processor includes a graphics context memory for storing the parameters of an image which is the subject of a current command, a processing unit for receiving and executing the commands issued by the host computer and for converting the parameters stored in the graphics context into the display data, and a drawing unit for writing the display data into the display memory.

The improved graphics control system of the present invention further comprises a shared memory which is directly accessible by both the host computer and by the graphics processor. Because the shared memory is directly accessible by the host computer and by the graphics processor, the host computer can write the graphics context parameters of a next command into the shared memory while the graphics processor is executing a current command. When the graphics processor completes execution of the current command, it can receive the graphics context parameters of the next command to be executed directly from the shared memory. Because the host computer is able to store the next set of graphics context parameters in the shared memory while a current command is being executed, the host computer does not have to wait until completion of the current command before computing the graphics context parameters for the next command and entering them in the graphics processor. Thus, the host computer will not have to access the graphics processor so frequently when the graphics context needs to be changed.

In the case of a window swap, the graphics context parameters of the two windows can be exchanged between the graphics context and the shared memory. Specifically, the graphics context parameters of one window are transferred from the graphics processor to the shared memory and the graphics context parameters of a second window are transferred from the shared memory to the graphics processor.

In a preferred embodiment of the invention, the graphics context parameters are transferred between the shared memory and the graphics processor by a bit-block transfer method. This is a particularly fast method of transferring data and improves the performance of the inventive graphics control system.

In a further preferred embodiment of the invention, the graphics context includes a mask register therein. The mask register is an index register with individual bits corresponding to the individual parameter registers of the graphics context. When the host computer issues a command for transferring the graphics context parameters between the graphics processor and the shared memory, the mask register is used to indicate which specific parameters are to be transferred and which are not. Thus, the mask register will make it possible for the graphics processor to avoid transferring all of the parameters between the graphics context and the shared memory each time, thereby speeding up the transfer process and improving computer performance.

DETAILED DESCRIPTION OF PREFERRED EMBODIMENT

Figure 1:
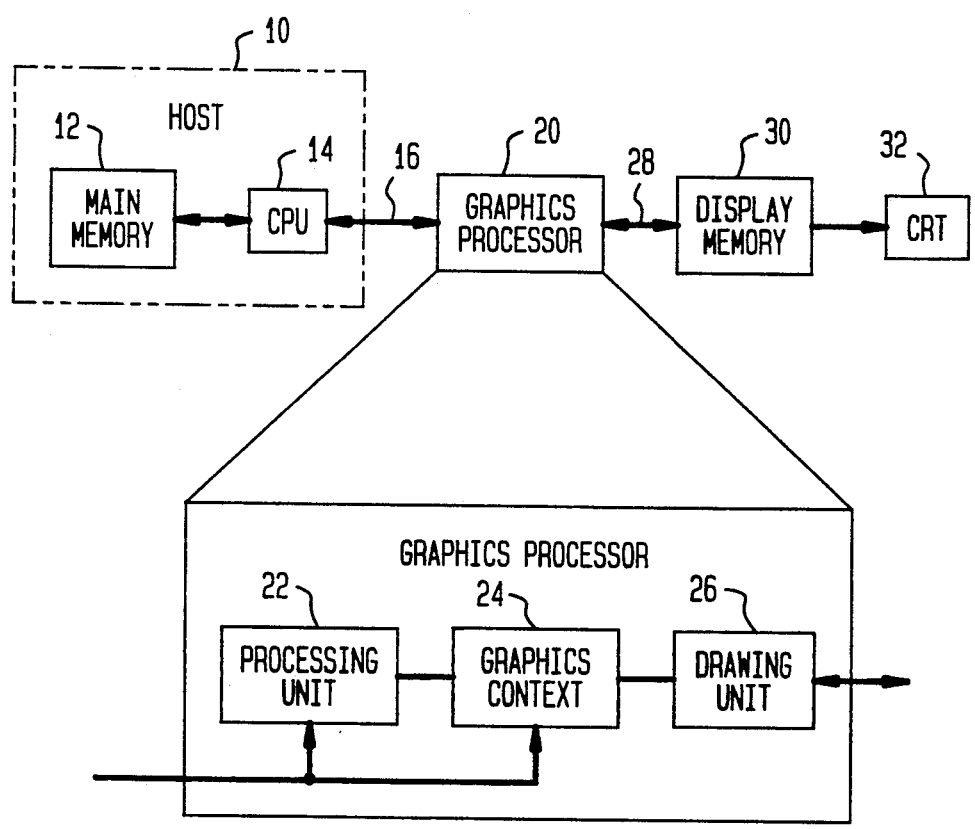
FIG. 1 is a block diagram showing a graphics control system according to the prior art.
Figure 2:
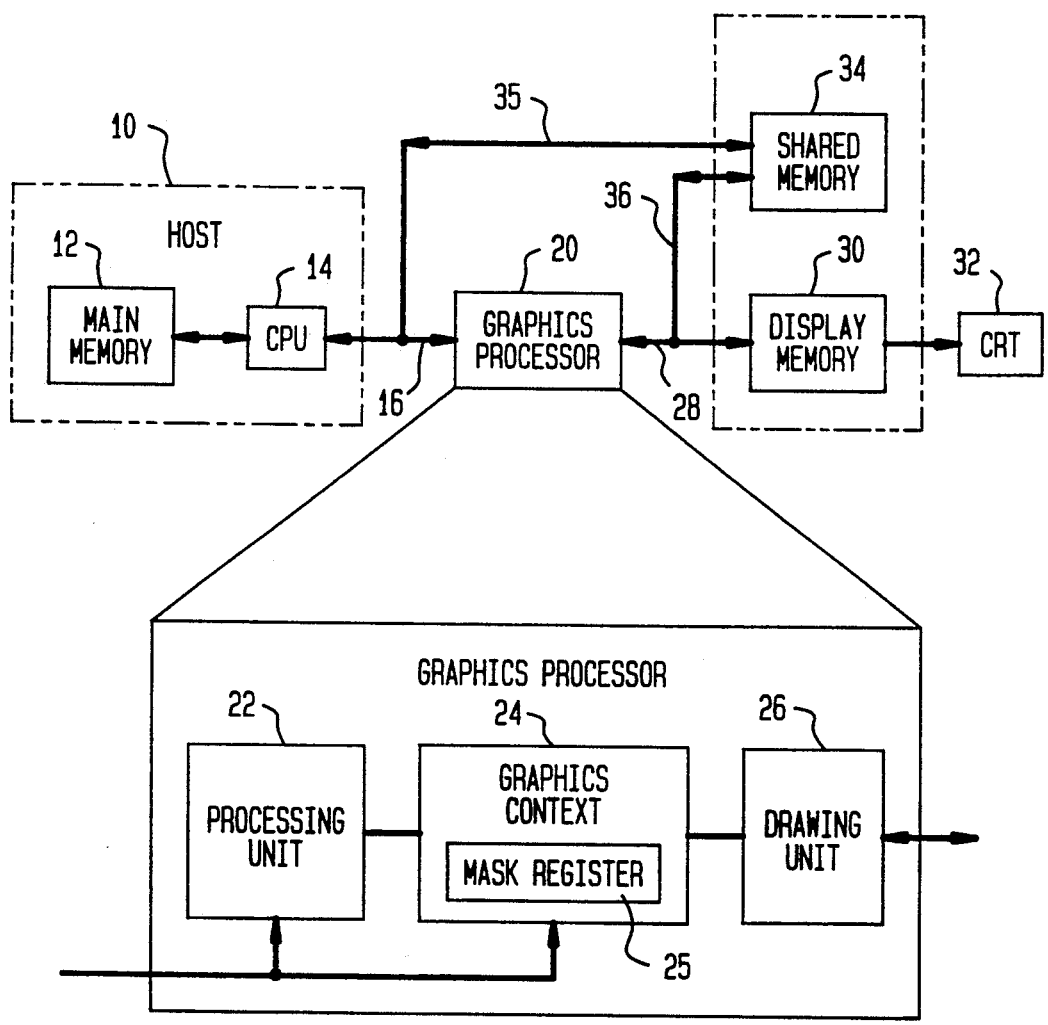
FIG. 2 is a block diagram showing a graphics control system in accordance with the present invention.

Referring to FIG. 2, a graphics control system in accordance with the present invention is illustrated. The inventive graphics control system, like the prior art system illustrated in FIG. 1, comprises a host computer 10 having a main memory 12 and a CPU 14, a graphics processor 20, a display memory 30, and a CRT 32. The graphics processor 20 comprises a processing unit 22, a graphics context 22, and a drawing unit 26. As in the prior art, the host computer 10 issues commands to the graphics processor 20 via the bus 16. The graphics context 24 stores parameters needed to carry out a current graphics command. The processing unit 22 receives and executes the commands issued by host computer 10, and also converts the current parameters stored in the graphics context 24 into display data. The drawing unit 26 writes the display data into the display memory via the line 28. The display data stored in display memory 30 are then displayed on the CRT 32.

Unlike the prior art graphics control system shown in FIG. 1, the inventive system illustrated in FIG. 2 also includes a mask register 25 (to be discussed in detail below) in the graphics context 24, and a shared memory 34. The shared memory 34 is connected to the host computer 10 by the bus 35, and to the graphics processor 20 by the bus 36.

The shared memory 34 can be considered as an extension of display memory 30. Its function is to provide a storage area for the graphics context parameters of various windows. It can also function as the off-screen display memory.

In accordance with the present invention, the shared memory 34 is directly accessible by the host computer 10 via bus 35, and is directly accessible by the graphics processor 20 via the bus 36. The host computer 10 does not have to wait for the graphics processor 20 to complete the execution of a current drawing command before computing and storing the graphics context parameters for the next drawing command. Instead, it can compute and then write the next set of graphics context parameters into the shared memory 34 while a current drawing command is being executed by graphics processor 20. The moment the graphics processor 20 completes its current drawing command, the host computer 10 can issue another command for the graphics processor 20 to access the graphics context parameters stored in the shared memory 34 and to perform the drawing operation accordingly. Thus, the host computer 10 no longer has to wait for the graphics processor 20 to complete its current command, and its efficiency is greatly enhanced.

In addition, the shared memory may also be used for improving the efficiency of a window swap. In particular, the graphics context parameters of one window can be moved from the graphics processor to the shared memory and the graphics context parameters of another window can be transferred from the shared memory to the graphics processor.

With regard to the method by which the graphics processor 20 communicates with the shared memory 34 via bus 36, in a preferred embodiment of the invention, a bit-block-transfer method is used to write the contents of the graphics context 24 into the shared memory 34, and to write the graphics context parameters from shared memory 34 into the graphics context 24. This is a particularly rapid method for transferring data between two individual storage buffers.

As is known, the bit-block-transfer method is a drawing technique that is capable of moving a block of data from one location to another without having to define many parameters. It is only necessary to specify a source and a destination for the block of data, and the initial address where the data is to be stored. This method can be used to transfer a block of data between different memory devices. Using this method, the host computer does not have to spend a lot of time updating the graphics context.

Figure 3:
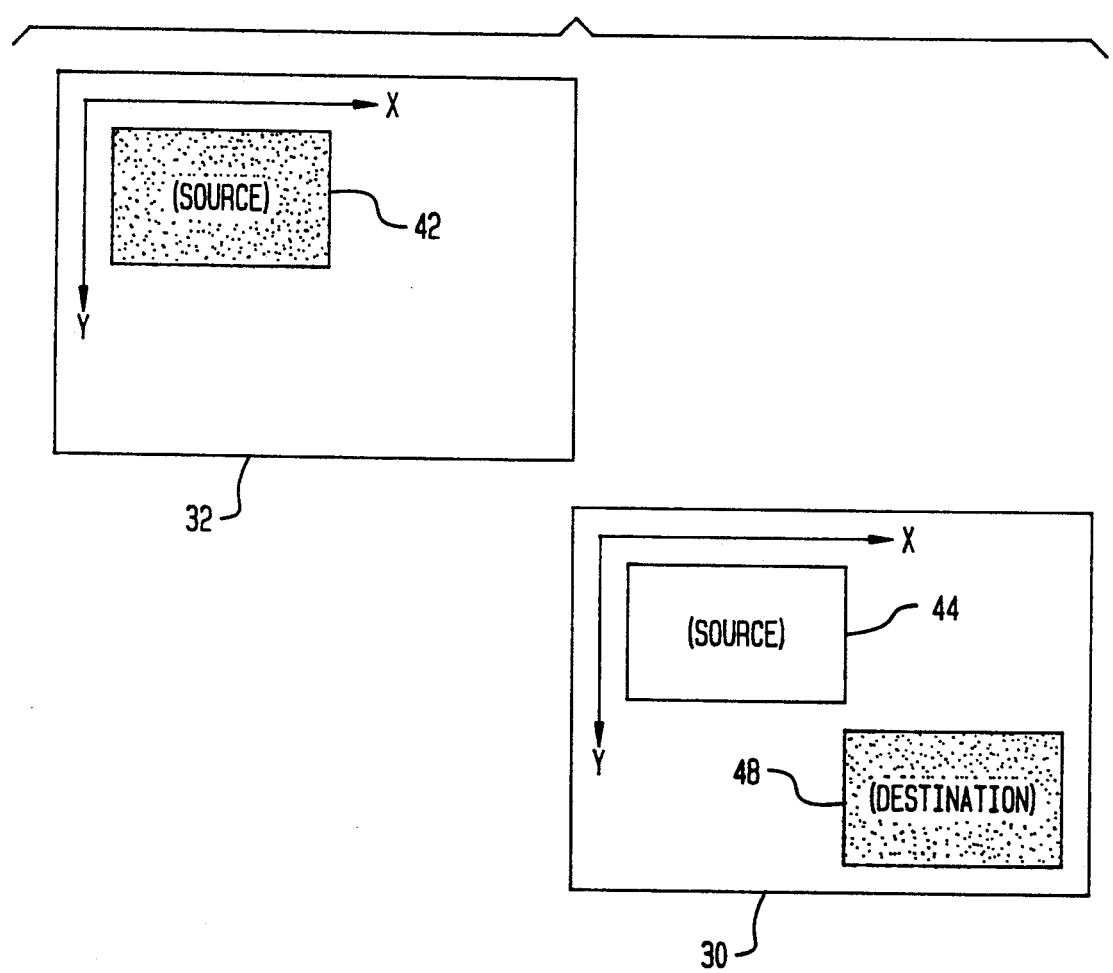
FIG. 3 illustrates the concept of bit-block-transfer which is employed in a preferred embodiment of the present invention.

The bit-block-transfer method may be further explained by reference to FIG. 3 which shows this technique for transferring a block of data within a single memory device, namely, the display memory 30. In FIG. 3, the CRT 32 is shown displaying a window image 42 thereon. The window image 42 corresponds to a block of display data which is stored in a first section 44 of the display memory 30. The block of data may be moved to another location 48 in the display memory 46 merely by specifying an initial address and carrying out a simple drawing operation for the entire block of data without specifying any other parameters. It should be noted that the source and destination of the block of data do not necessarily have to be within the display memory to use the bit-block-transfer method. There can be two individual storage buffers with sequential addresses, for example, the graphics context and an area of shared memory, and the graphics processor will be able to move around a block of data between these two buffers when the host generates the appropriate command.

In accordance with a preferred embodiment of the invention, this bit-block-transfer method is adapted for transferring blocks of data between the graphics context 24 and the shared memory 34. Thus, if the graphics context parameters are to be transferred from the graphics context 24 to the shared memory 34, the host computer must only specify the source and the destination of the data and the starting address. The context graphics parameters can then be transferred as a block of data from graphics context 24 to shared memory 34. A similar technique is employed to transfer the graphics context parameters of the next image to be displayed from the shared memory 34 to the graphics context 24 in the graphics processor 20.

In a further preferred embodiment of the invention, the transfer of data between the graphics processor and the shared memory is also enhanced by employing a mask register in the graphics context. The mask register is an index register with its individual bits corresponding to the individual parameter registers of the graphics context. When the host computer instructs the graphics processor to move parameters from the graphics context 24 to the shared memory 34, the mask register is used to determine which parameters are to be transferred and which are not. Similarly, when the host computer instructs the graphics processor transfer a new set of graphics context parameters from the shared memory to the graphics context, the mask register is used to determine which parameters are to be transferred from the shared memory. In other words, the mask register acts as a filter for transferring the graphics context parameters between the graphics processor and the shared memory.

Figure 4A:
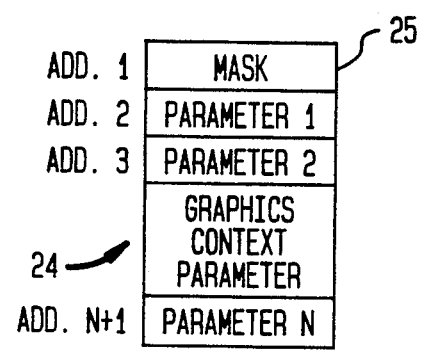
FIG. 4(a) illustrates the contents of a graphics context including a mask register.
Figure 4B:
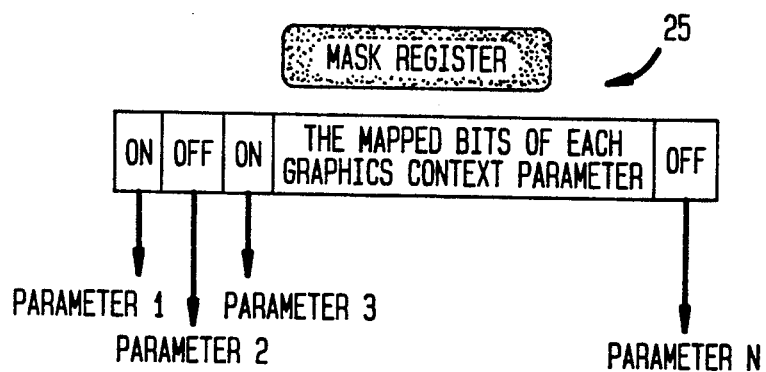
FIG. 4(b) illustrates the mask register concept.
Figure 4C:
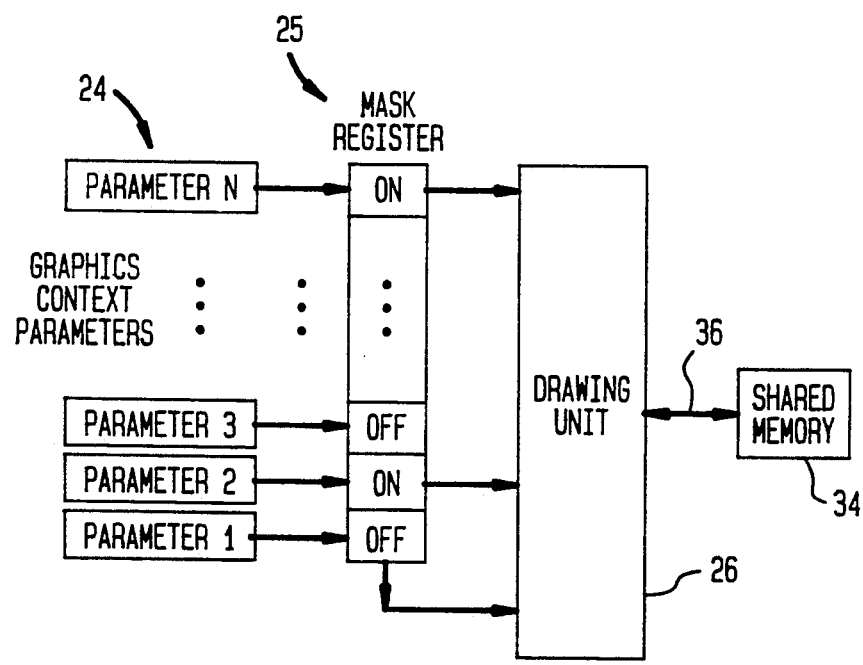
FIG. 4(c) is a block diagram illustrating the writing of the graphics context parameters into the shared memory.

The use of a mask register will be better understood by reference to FIGS. 4(a)-4(d). FIG. 4(a) shows a set of graphics context parameters stored in the graphics context 24 of graphics processor 20. The mask register 25 is stored in address location 1 of the graphics context 24, while the remaining graphics context parameters 1, . . . ,N are stored in sequential address location 2, . . . ,N+1. Referring next to FIG. 4(b), the content of the mask register 25 is illustrated. Each bit in the mask register 25 corresponds to one of the parameters 1, . . . ,N stored in the graphics context 24. If a bit in mask register 25 is set to ON, the corresponding parameter can be transferred during changes in the graphics context. On the other hand, if a bit in mask register 25 is set to OFF, then the corresponding parameter will not be transferred. For example, when the graphics processor is instructed to store its current graphics context parameters in the shared memory 34, the host computer 10 will first write values into the mask register 25 to indicate which of the parameters are to be stored and which can be ignored. Subsequently, the host computer 10 will proceed to define the graphics context as the source and the shared memory as the destination, will provide an initial address in the shared memory, and will issue a command for a bitblock transfer. The graphics processor will then perform the operation illustrated in FIG. 4(c). In FIG. 4(c), the drawing unit 26 will first write the mask register 25 into the shared memory 34. Thereafter, the drawing unit 26 will write into the shared memory 34 only those parameters whose corresponding bits in the mask register 25 are ON. Those parameters in the graphics context whose corresponding bits are OFF will be ignored.

When the graphics processor 20 is instructed to read a set of the graphics context parameters from the shared memory 34, the host computer 10 will define the shared memory 34 as the source and the graphics context 24 as the destination. The host computer 10 will also provide an initial address of the shared memory, issue a command for a bit-block-transfer, and the graphics processor will perform the operation illustrated in FIG. 4(d).

Figure 4D:
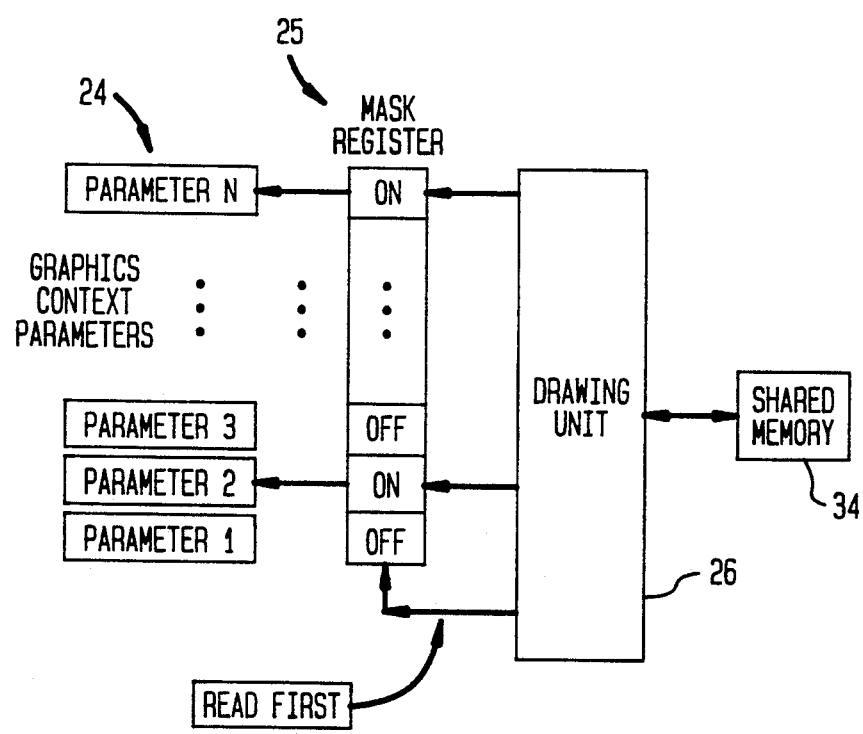
FIG. 4(d) is a block diagram illustrating the reading of the graphics context parameters from the shared memory.

In FIG. 4(d), the initial address in the shared memory 34 provided by the host computer 10 is actually the address where the mask register 25 for the new image to be displayed is stored in the shared memory. The mask register 25 for the new image will be read out from the shared memory first. Once this is done, the graphics processor 20 will utilize the bits in the mask register as a filter to determine which parameters are to be read from the shared memory 34 into the graphics context 24.

The use of both the bit-block transfer method and the mask register will save considerable read/write time for the host computer and graphics processor, and will enable the graphics processor to access a large amount of data in minimal time. It is therefore desirable that these techniques be used by the graphics processor to communicate data to and from the shared memory.

The graphics control system of the present invention is particularly useful in computer applications which employ window displays. In such applications, there is a frequent need to move windows to different locations on the display screen and to swap windows. The use of a shared memory greatly enhances the performance of the system. The shared memory can also function as an off-screen display memory which stores the unshown portion of a window.

In summary, the graphics control system of the present invention improves the efficiency of window processing and drawing in a number of ways. While the graphics processor is executing a current command, the host computer is able to read/write the graphics context parameters of a next graphics command inside the shared memory, thereby saving the time to update the graphics context and improve the efficiency of the host CPU. The graphics context parameters are accessed by a bit-block transfer method which is a very rapid method of transferring so that the host computer spends the least possible time on the graphics processor. Additionally, a mask register is incorporated into the graphics context, thereby rendering the amount of data to be transferred to be flexible.

While the invention has been described with reference to specific embodiments, this was for purposes of illustration only. Numerous alternative embodiments will be apparent to those skilled in the art and are considered to be within the spirit and the scope of the invention.

We claim:

1. A graphics control system, comprising
a host computer for generating graphics commands, a graphics processor for receiving and executing graphics command generated by said host computer, a display memory for storing display data and a display device for displaying said displayed data, said graphics processor including a graphics context memory for storing parameters of an image corresponding to a current command, a processing unit for receiving and executing the graphics commands issued by the host computer and for converting the parameters stored in the graphics context memory into display data, and a drawing unit for storing display data in said display memory, and a shared memory which is directly accessible to said host computer for enabling said host computer to write the parameters of a next graphics command into said shared memory while said graphics processor is executing a current command, said shared memory also being directly accessible to said graphics processor for enabling said graphics processor to receive said parameters of a next graphics command directly from said shared memory, wherein said shared memory also enables said graphics processor to exchange the graphics context parameters of one window contained in said graphics processor with the graphics context parameters of another window stored in said shared memory.

2. The graphics control system of claim 1 wherein said shared memory is directly accessible to said graphics processor for enabling said graphics processor to transfer said parameters of a current command directly into said shared memory.

3. The graphics control system of claim 1 wherein said parameters of a next graphics command to be processed are transferred between said graphics context and said shared memory by a bit block transfer method.

4. The graphics control system of claim 1 wherein said graphics context memory includes a mask register comprising a plurality of bits which bits each corresponds to a different graphics context parameter, said bits of said mask register including information for designating which parameters to transfer between said graphics context memory and said shared memory.

5. The graphics control system of claim 1 wherein said display device is a CRT.

6. A method for executing graphics commands in a computer having a graphics control system comprising a host computer, a graphics processor including a processing unit, a graphics context memory, and a drawing unit, a display memory, a display device, and a shared memory, said method comprising generating graphics memory including graphics context parameters by said host computer and executing said commands in said graphics processor, storing graphics context parameters of an image corresponding to a current command in said graphics context memory of said graphics processor, while storing a set of graphics context parameters of an image corresponding to a subsequent command in said shared memory, and after said current command has been executed, transferring the parameters for said subsequent command to be executed directly from said shared memory into said graphics context memory of said graphics processor, and selectively swapping windows using said graphics processor and said shared memory by exchanging the graphics context parameters of one window contained in said graphics processor with the graphics context parameters of another window stored in said shared memory.

7. The method of claim 6 wherein said parameters of said subsequent command are written directly into said shared memory by said host computer while said graphics processor is executing said current command.

8. The method of claim 6 wherein the parameters of said current command and said subsequent command to be executed are transferred between said graphics processor and said shared memory by a bit block transfer method.

9. The method of claim 6 further comprising storing in particular bits of a mask register of said graphics context memory, which bits each corresponds to a different graphics context parameter, information designating which parameters to transfer between said graphics content memory and said shared memory, transferring only the designated parameters between said graphics processor and said shared memory.

10. A graphics control system, comprising a host computer for generating graphics commands, a graphics processor for receiving and executing graphics command generated by said host computer, a display memory for storing display data and a display device for displaying said displayed data, said graphics processor including a graphics context memory for storing parameters of an image corresponding to a current command, a processing unit for receiving and executing the graphics commands issued by the host computer and for converting the parameters stored in the graphics context memory into display data, and a drawing unit for storing display data in said display memory, and a shared memory which is directly accessible to said host computer for enabling said host computer to write parameters of a next graphics command into said shared memory while said graphics processor is executing a current command, said shared memory also being directly accessible to said graphics processor for enabling said graphics processor to receive said parameters of a next graphics command directly from said shared memory, wherein said graphics context memory comprises a mask register having a plurality of bits which each corresponds to a different graphics context parameter, for designating which parameters to transfer between said graphics context memory and said shared memory.

11. A method for executing graphics commands in a computer having a graphics control system comprising a host computer, a graphics processor including a processing unit, a graphics context memory, and a drawing unit, a display memory, a display device, and a shared memory, said graphics context memory including a mask register having a plurality of bits which each corresponds to a different graphics context parameter, said method comprising generating graphics commands including graphics context parameters by said host computer and executing said commands in said graphics processor, storing graphics contet parameters of an image corresponding to a current command in said graphics context memory of said graphics processor, while storing a set of graphics contet parameters of an image corresponding to a subsequent command in said shared memory, storing in said bits of said mask register, information designating which graphics context parameters to transfer between said graphics context memory and said shared memory, and after said current command has been executed, transferring only designated parameters for said subsequent command to be executed directly from said shared memory into said graphics context memory of said graphics processor.

* * * * *